(12) United States Patent
Thompson et al.

(10) Patent No.: US 11,913,306 B1
(45) Date of Patent: Feb. 27, 2024

(54) BALL CAGE INSERT WITH REDUCED WEAR, REDUCED PRESSURE DROP, AND ENHANCED PERFORMANCE CHARACTERISTICS

(71) Applicant: Ravdos Holdings Inc., Missouri City, TX (US)

(72) Inventors: Michael L Thompson, Midland, TX (US); Juan Felipe Correa Pugliese, Fort Worth, TX (US); Edwardo Guerrero, Odessa, TX (US)

(73) Assignee: Ravdos Holdings Inc., Missouri City, TX (US)

( * ) Notice: Subject to any disclaimer, the term of this patent is extended or adjusted under 35 U.S.C. 154(b) by 0 days.

(21) Appl. No.: 18/053,933

(22) Filed: Nov. 9, 2022

(51) Int. Cl.
*E21B 34/08* (2006.01)
*F16K 15/04* (2006.01)

(52) U.S. Cl.
CPC ............. *E21B 34/08* (2013.01); *F16K 15/04* (2013.01); *E21B 2200/04* (2020.05); *F16K 2200/502* (2021.08)

(58) Field of Classification Search
CPC ...... E21B 34/08; E21B 2200/04; F16K 15/04; F16K 2200/502
See application file for complete search history.

(56) References Cited

U.S. PATENT DOCUMENTS

| | | | |
|---|---|---|---|
| 3,771,556 A * | 11/1973 | Gifford | F16K 15/04 74/587 |
| 4,071,045 A * | 1/1978 | Brandt | F16K 15/04 137/528 |
| 5,593,292 A * | 1/1997 | Ivey | F04B 53/101 137/533.15 |
| 6,029,685 A | 2/2000 | Carruth | |
| 6,199,636 B1 | 3/2001 | Harrison | |
| 6,283,148 B1 | 9/2001 | Spears et al. | |
| 7,069,997 B2 | 7/2006 | Coyes et al. | |
| 8,453,673 B2 | 6/2013 | Ford | |
| 10,184,314 B1 | 1/2019 | Bair et al. | |
| 10,767,445 B2 | 9/2020 | Stachowiak, Jr. et al. | |
| 11,125,349 B1 | 9/2021 | Samayamantula | |
| 2010/0269928 A1 * | 10/2010 | Ford | F16K 27/0245 137/533.19 |
| 2020/0011154 A1 | 1/2020 | Stachowiak, Jr. | |
| 2020/0208503 A1 * | 7/2020 | Dyck | F16K 15/04 |

(Continued)

OTHER PUBLICATIONS

Weatherford, Weatherford Stealth Cage, 2021.

*Primary Examiner* — Daphne M Barry
*Assistant Examiner* — Frederick D Soski
(74) *Attorney, Agent, or Firm* — McAughan Deaver PLLC

(57) ABSTRACT

A ball valve cage insert that includes: (1) a first section including an inlet ring having a radial wall thickness varies along the longitudinal axis of the cage; (2) a second section including side ribs that define a plurality of side openings, where the width of each opening varies from a first width at a first radial distance from the longitudinal axis to a second width at a second radial distance and (3) a third section including closure ribs extending from a first point at a first radial distance from the longitudinal axis to a second point where, as measured at a given radial distance from the longitudinal axis, the width of each closure rib varies from a first circumferential width at a first point on the longitudinal axis to a second width at a second point on the longitudinal axis.

4 Claims, 10 Drawing Sheets

(56) References Cited

U.S. PATENT DOCUMENTS

| | | | | |
|---|---|---|---|---|
| 2021/0131423 A1* | 5/2021 | Valenzuela | ............. | F04B 47/06 |
| 2021/0246992 A1* | 8/2021 | Ford | ................ | F16K 15/04 |
| 2021/0270381 A1* | 9/2021 | Samayamantula | ................ | F16K 27/0245 |
| 2021/0301621 A1* | 9/2021 | Pola | ................ | E21B 34/12 |
| 2021/0381338 A1* | 12/2021 | Coyes | ................ | E21B 34/08 |
| 2022/0090470 A1 | 3/2022 | Pugliese et al. | | |
| 2023/0203913 A1* | 6/2023 | Stachowiak, Jr. | ...... | F04B 47/02 137/533.11 |

\* cited by examiner

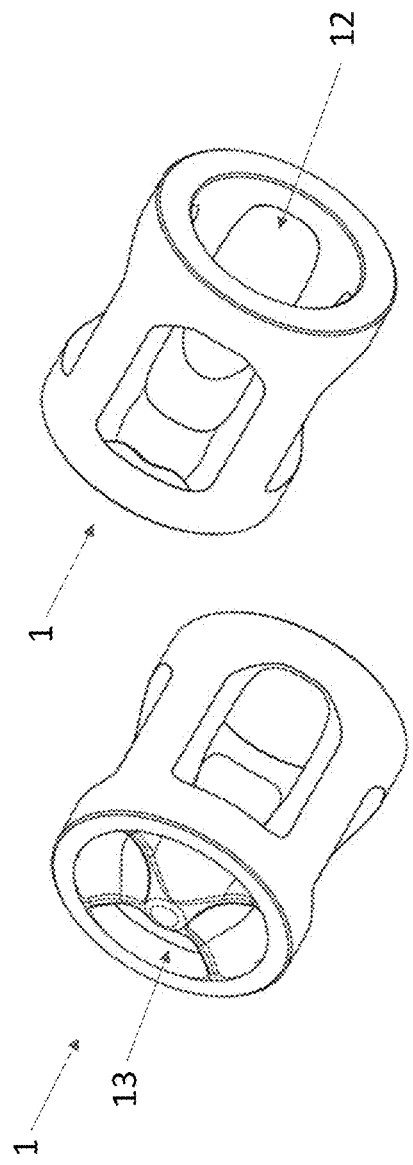
FIG. 1A
FIG. 1B
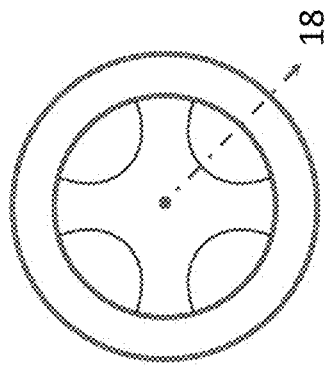
FIG. 2
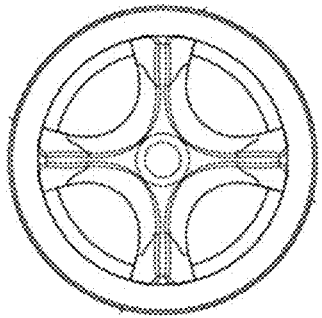
FIG. 3
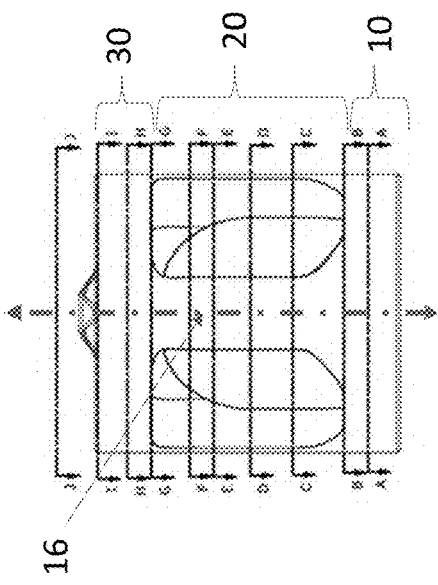
FIG. 4

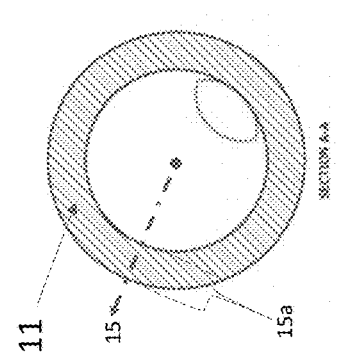

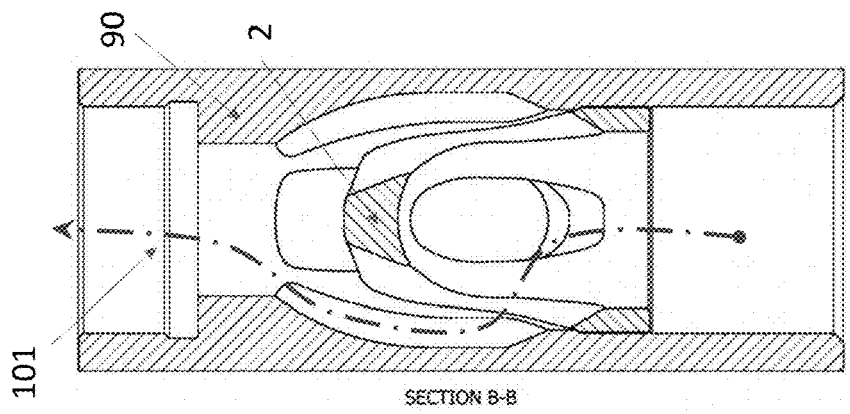
FIG. 10B
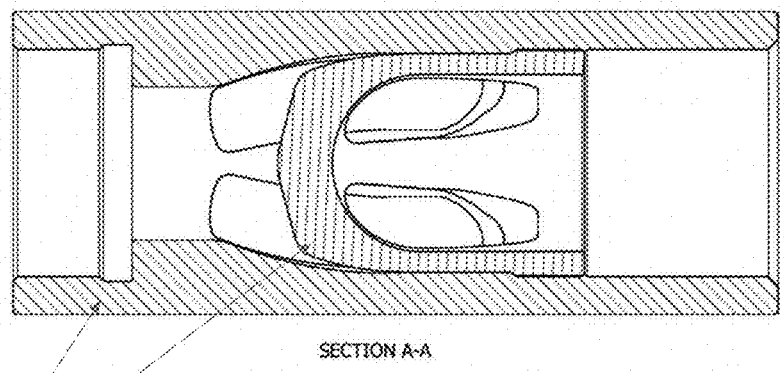
FIG. 10A
FIG. 10
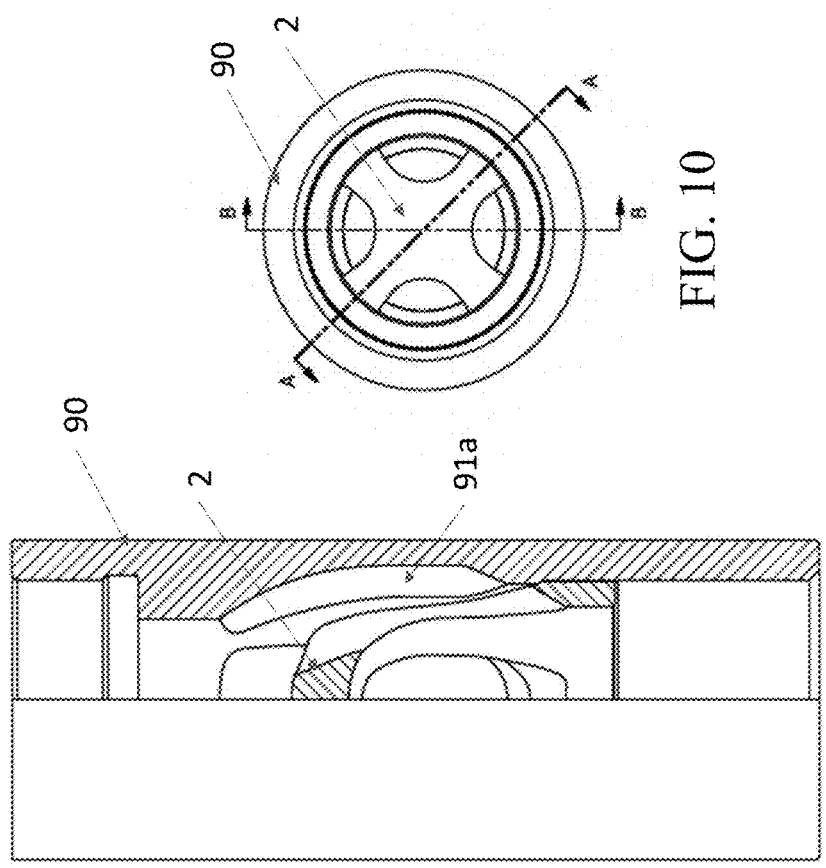
FIG. 9

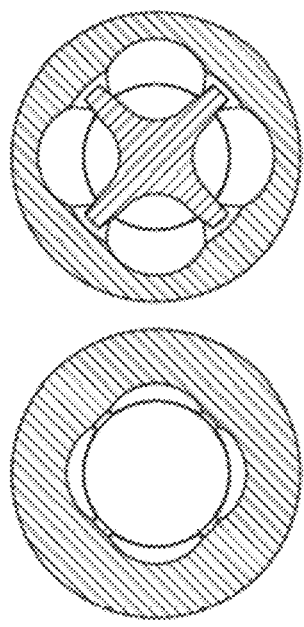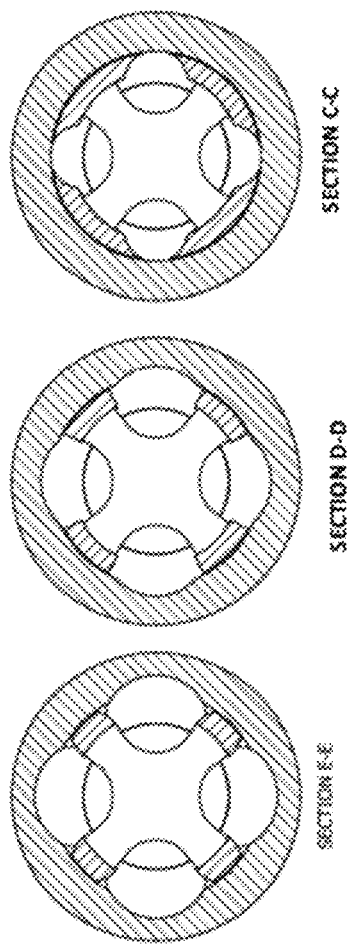

BALL CAGE INSERT WITH REDUCED WEAR, REDUCED PRESSURE DROP, AND ENHANCED PERFORMANCE CHARACTERISTICS

BACKGROUND

The present inventions relate to a ball cage insert for use in a downhole sucker rod pumping system.

It is known in the field of oil and gas production to use a sucker rod pump system that includes a ball check valve formed, in part, though a tubular element defining a bore through which fluid can flow, a valve seat positioned within the bore, a ball cage within the tubular element (which can take the form of a ball cage insert or a ball cage integrally formed within a portion of the tubular element) and a ball positioned within the ball cage over the valve seat. In such conventional systems, the identified elements are arranged such that, during operation of the sucker rod pump, the ball can move from a "closed" position (in which fluid flow through the ball valve is prevented) to an "open" position (in which fluid flow through the valve is permitted). In the closed position the ball rests on, and seals against, the ball seat such that the seal between the ball and the ball seat prevents the flow of fluid through the valve. In the open position the ball is displaced from the valve seat and located within the ball cage such that a fluid flow area is defined between the ball, the ball cage, and the tubular element through which fluid can flow.

Typically, during each stroke of a sucker rod pump, a ball within a ball cage will transit from a closed position to a full open position (where the ball rests against a surface of the ball cage) back to a closed position at least once.

As the ball transits between the closed position and the fully-open position it will be subject to different forces as the fluid flow path through the check-valve changes. Such forces can cause the ball to move within the ball cage and, in many instances can cause the ball to move in such a way that it impacts against a surface of the ball cage. The repetitive impact of a ball against the ball cage is sometimes referred to as ball "chatter" or "rattling." Ball chatter (or rattling), when experienced repeatedly over a long period of time, can induce stresses on the ball cage and the repetitive impacts of the ball against the ball cage can damage the structure from which the ball cage is formed. Such situations can also damage the ball.

Conventionally, a ball cage insert will take the form of component that includes an upper ring-like structure, a lower ring-like structure and a plurality of ribs connecting the top ring to the bottom ring. The arrangement of the connecting ribs is such one or more fluid flow spaces (or side openings) are defined between the ribs. One such known embodiment is depicted in FIGS. 7 and 8 of U.S. Pat. No. 7,069,997.

As reflected those figures, a ball cage insert is depicted that includes an upper ring 3, a lower ring 4 and a plurality of rib elements 5 connecting the upper and lower rings. The rings and the rib elements are configured such that a plurality of flow openings 6 are defined between the rib elements. A valve ball 8 is positioned within the ball cage insert such that it can move within the cage from a first orientation corresponding to a valve closed position (reflected in FIG. 7 of the referenced '997 Patent) to a second orientation where it rests against the ball cage insert that corresponds to a vale open position (reflected in FIG. 8 of the referenced '997 Patent).

In conventional ball cage designs, the linear distance between the edges of adjacent ribs is substantially constant. Expressed differently, in conventional designs, the arcuate span between points on the edges of adjacent ribs varies with the radial location of those points. Expressed in yet another way, in conventional designs where the ball cage has a circular cross section, a line passing along the surface of a rib element will not intersect the center of the circle.

Inspection of conventional ball cage inserts used in the field for an extended period of time has revealed that, in many applications, an extensively used conventional ball cage insert will show signs of wear in the form of material loss that occurs, for example, along portions of the inner sections of the rib elements. Such material loss is believed to be the result of chatter or other impacts that occur between the ball and the cage insert as the ball, especially impacts that occur as the ball transitions from a closed orientation to an open orientation and/or erosion caused by aggressive fluid flow through the insert.

In addition to suffering from wear (including material loss) conventional ball cage inserts limit the effective operation of sucker rod pump assemblies in which they are used by introducing undesired pressure drops into the sucker rod pump as the valve ball moves between its closed and open orientation. Such undesired pressure drops are believed to be produced, at least in part, by the characteristics of the fluid flowing through the ball cage insert during periods where the valve ball is not in its closed orientation.

The embodiments described below, are intended to avoid, minimize, or overcome some or all the described limitations of the prior art, as well as other limitations and provide additional advantages.

BRIEF SUMMARY OF THE INVENTION

A brief non-limiting summary of one of the many possible embodiments of the present disclosure is a ball valve cage insert for use in a downhole sucker rod pumping assembly, the ball valve cage insert defining a longitudinal axis, a radial axis normal to the longitudinal axis, the ball valve cage insert including: a first section having a first longitudinal length, the first section including an inlet ring wall defining a generally circular inlet opening, the generally circular inlet opening defining a center point through which a longitudinal axis passes, wherein the radial thickness of the inlet ring wall, when measured from the longitudinal axis, varies from a first thickness at a first point along the longitudinal axis to a second thickness at a second point along the longitudinal axis; a second section having a second longitudinal length, the second section including a plurality of side ribs extending generally along the longitudinal axis, the side ribs defining a plurality of side openings, wherein, along a given plane passing normally through the longitudinal axis, the circumferential width of each opening at a first point at a first radial distance from the longitudinal axis varies from the circumferential with of such opening at a second point at a second radial distance from the longitudinal axis; a third section having a third longitudinal length, the third section including a plurality of closure ribs extending at least in part from a first point at a first radial distance from the longitudinal axis to a second point at a second radial distance from the longitudinal axis, wherein the second point is radially closer to the longitudinal axis than is the first point, and wherein, as measured at a given radial distance from the longitudinal axis, the circumferential width of each closure rib varies from first circumferential width at a first point on the longitudinal axis to a second point at a second point of the longitudinal axis.

Additionally, or alternately, an embodiment of the present disclosure may take the form of a pump cage comprising: a lower ring defining generally circular inlet opening, the generally circular inlet opening defining a center point through which a longitudinal axis passes; and a plurality of side ribs, each side rib having a longitudinal length and extending longitudinally from the lower ring, each side rib having an inner surface and an outer surface, wherein the inner surface is radially closer to the longitudinal axis than the outer surface; and wherein, along at least a majority of longitudinal length of the side ribs, the angular span of each of side rib as measured with respect to the longitudinal axis at the inner surface of the rib is substantially the same as the angular span of each side rib as measured with respect to the longitudinal axis at the outer surface of the rib.

Still further, and additionally, or alternately, an embodiment of the present disclosure may take the form of a sucker rod pump ball valve cage comprising: a first circular wall defining a circular inlet opening, the opening having a center point and defining a longitudinal axis extending normal to the circular opening and through the center point; and an intermediate section including a plurality of side ribs that extend from the first circular wall and define a plurality of valve cage openings; wherein the radial thickness of the first circular wall varies from a first thickness at a first point along the longitudinal axis to a second radial thickness at a second point along the longitudinal axis, wherein the second thickness is less than the first thickness and wherein the first point is longitudinally closer to the inlet opening than is the first point.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE DRAWINGS

The following figures form part of the present specification and are included to demonstrate further certain aspects of the present invention. The invention may be better understood by reference to one or more of these figures in combination with the detailed description of certain embodiments presented herein.

FIGS. 1A and 1B illustrate perspective views of the exemplary ball valve cage insert 1, with FIG. 1A reflecting a perspective view showing a partially closed top 13 and certain sides of the cage insert 1 and FIG. 1B reflecting a perspective view showing an open bottom 12 and certain sides of the cage.

FIG. 2 illustrates a top-down view of the cage insert 1 looking down onto the partially closed top 13.

FIG. 3 illustrates a bottom-up view of cage insert 1 looking up from the open bottom 12.

FIG. 4 shows a side view of cage insert 1.

FIGS. 4A-4J show various cross-sections taken across the section lines A-J depicted in FIG. 4.

FIGS. 9, 10, 10A-10B, 11 and 11C-11F illustrates the exemplary cage insert used in a sucker rod pump assembly wherein the cage insert 2 is affixed within a pump cage 90 in which passages are machined or formed.

Figure 5:
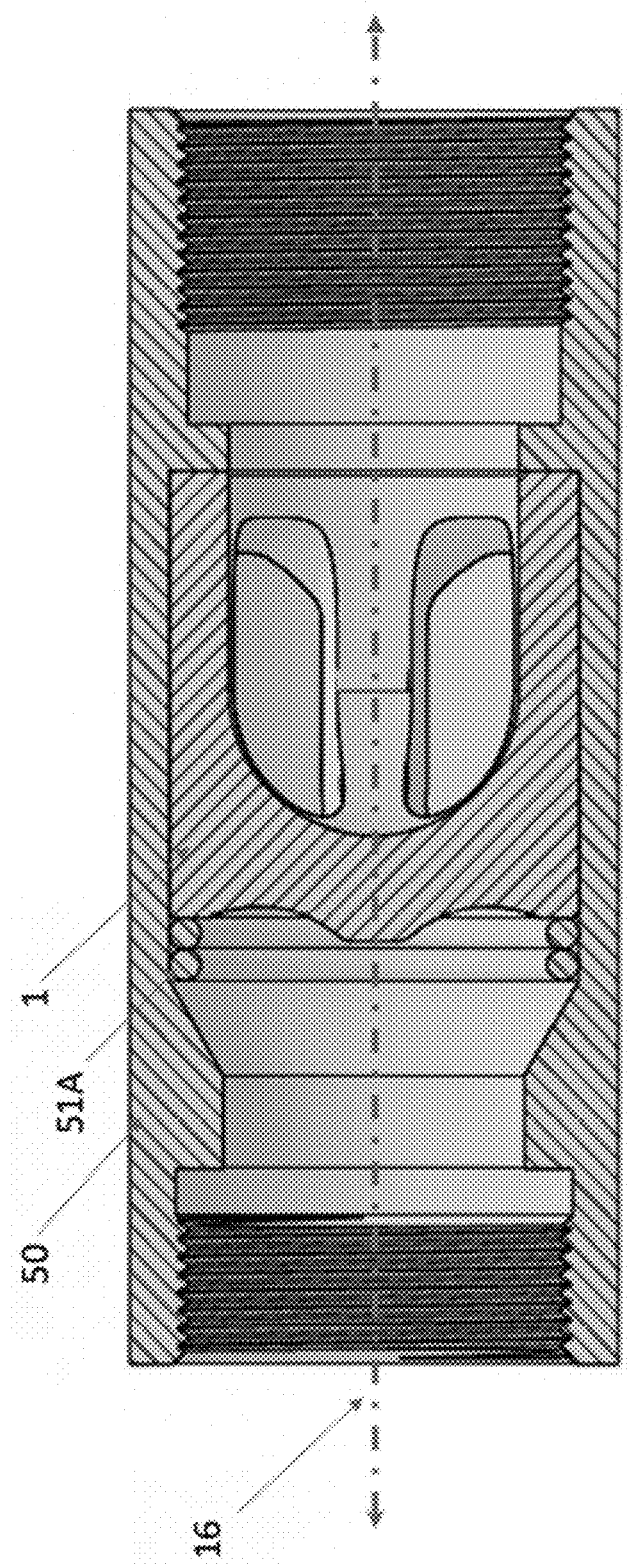
FIG. 5 illustrates the exemplary cage insert 1 used in a sucker rod pump assembly wherein the cage insert 1 is affixed within a pump cage 50.

While the inventions disclosed herein are susceptible to various modifications and alternative forms, only a few specific embodiments have been shown by way of example in the drawings and are described in more detail below. The figures and detailed descriptions of these embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts illustrated and taught by the specific embodiments.

DETAILED DESCRIPTION

The Figures described above, and the written description of specific structures and functions below, are not presented to limit the scope of what has been invented or the scope of the appended claims. Rather, the Figures and written description are provided to teach any person skilled in this art to make and use the inventions for which patent protection is sought.

A person of skill in this art having benefit of this disclosure will understand that the inventions are disclosed and taught herein by reference to specific embodiments, and that these specific embodiments are susceptible to numerous and various modifications and alternative forms without departing from the inventions we possess. For example, and not limitation, a person of skill in this art having benefit of this disclosure will understand that Figures and/or embodiments that use one or more common structures or elements, such as a structure or an element identified by a common reference number, are linked together for all purposes of supporting and enabling our inventions, and that such individual Figures or embodiments are not disparate disclosures. A person of skill in this art having benefit of this disclosure immediately will recognize and understand the various other embodiments of our inventions having one or more of the structures or elements illustrated and/or described in the various linked embodiments. In other words, not all possible embodiments of our inventions are described or illustrated in this application, and one or more of the claims to our inventions may not be directed to a specific, disclosed example. Nonetheless, a person of skill in this art having benefit of this disclosure will understand that the claims are fully supported by the entirety of this disclosure.

Those persons skilled in this art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

Further, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the scope of what is claimed.

Reference throughout this disclosure to "one embodiment," "an embodiment," "an example" or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

The description of elements in each Figure may refer to elements of proceeding Figures. Like numbers refer to like elements in all figures, including alternate embodiments of like elements Turning to the drawings and, in particular, to FIGS. 1A-1B, 2, 3, and 4 a first exemplary embodiment of a sucker rod pump ball valve cage insert 1 incorporating certain aspects of the present disclosure is illustrated.

FIGS. 1A and 1B illustrate perspective views of the exemplary ball valve cage insert 1, with FIG. 1A reflecting a perspective view showing a partially closed top 13 and certain sides of the cage insert 1 and FIG. 1B reflecting a perspective view showing an open bottom 12 and certain sides of the cage. FIG. 2 illustrates a top-down view of the cage insert 1 looking down onto the partially closed top 13 and FIG. 3 illustrates a bottom-up view of cage insert 1 looking up from the open bottom 12. FIG. 4 shows a side view of cage insert 1 and FIGS. 4A-4J show various cross-sections taken across the section lines A-J depicted in FIG. 4.

The ball cage insert 1 may be constructed from any suitable material and may be formed using any suitable process. Suitable materials that may be used to form the ball cage insert 1 include, but are not limited to: suitable corrosion-resistant alloys including nickel alloys such as Monel; steel; ceramic materials; and any other material suited for the environment in which the insert 1 will be used. Suitable processes that may be used to form the ball cage insert 1 include casting; machining; a combination of casting and machining; 3D printing; powdered metallurgy; sintering; high injection pressure forming; or any suitable manufacturing process.

In the illustrated example, the ball cage insert 1 is formed as single unitary component. Alternate, multi-component, embodiments are envisioned.

Referring to the above-identified figures, in particular to FIG. 4, it will be seen that the exemplary the ball valve cage insert defines a longitudinal axis 16 extending longitudinally along the centerline of the cage insert 1. The cage insert 1 also defines a radial dimension that extends normal to and away from a centerline the longitudinal axis. Line 18 in FIG. 3 corresponds to an imaginary line extending radially from the centerline at one exemplary point along the longitudinal axis 16. As will be appreciated, while the exemplary radial axis 18 is shown as extending across only one plane of the interior of the insert 1, references herein to a radial axis normal to the longitudinal axis are intended to include any radial axis extending across the insert normal to the longitudinal axis 16.

As best shown in FIG. 4, the depicted exemplary insert may be interpreted as defining three sections: a first section 10; a second section 20 and a third section 30. It will be appreciated that, while the reference to three sections is useful for describing certain physical characteristics of the exemplary cage 1, cage 1 can be constructed as a single unitary element. It will also be understood that there is not necessarily a simple physical division point between sections and that regions at the points where two sections are adjacent one another can, potentially, be associated with either section. It will also be appreciated that a cage insert can have additional "sections" without departing from the teachings of the present disclosure.

As reflected in FIG. 4, in the illustrated example each of the first 10, second 20, and third 30 sections has a longitudinal length. In the example of FIG. 4, the longitudinal length of the second section 20 is approximately four (4) times the length of the first section 10, and the longitudinal length of the third section 30 is approximately the same length as the first section 10. Thus, in the example of FIG. 4, the longitudinal length of the second section is more than three times the longitudinal length of the first section. It will be appreciated that these lengths are exemplary only and that the lengths and relative lengths of the various sections (in three-section embodiments) can vary significantly from embodiment to embodiment.

FIGS. 4A-4J show cross sections of the insert 1, taken across the section lines A-J in FIG. 4 along various planes normal to the longitudinal axis 16 of the cage insert 1. The closed elements in FIGS. 4A-4J (and in FIGS. 8A-8D) (e.g., the closed element in the interior portion of FIG. 4A) reflect aspects of the illustrated cross-sections. Each section reflected on one of FIGS. 4A-4J, depicts a plane associated with a given point along the longitudinal axis 16. In general: the cross sections associated with FIGS. 4A and 4B are associated with the first section 10 of cage insert 1; the cross-sections associated with FIGS. 4C-4G are associated with the second section 20 of cage insert 1; and the cross sections of FIGS. 4H-I are associated with the third section 30. FIG. 4J reflects a top-down view of cage insert 1 and generally corresponds to FIG. 2.

Turning to FIGS. 4A and 4B cross sections associated with the first section 10 of cage insert 1 are depicted. Considering these sections in the context of FIG. 4 it will be appreciated that the first section 10 of cage insert 1 is associated with a portion of the cage insert 1 that does not include any side openings that create passages through which fluid can flow out of the cage insert 1. It will be understand that the reference to fluid flowing the potential for fluid to flow "out of" the cage insert 1 (or the exemplary cage insert 2, discussed below) is intended to encompass circumstances wherein a side opening of the cage insert permits fluid to flow through a region that is partially bounded by surfaces of the cage insert and partially bounded by a different structure, such as the wall of a pump cage.

As shown in FIG. 4A, at its lowest portion, the first section of cage insert 10 includes an inlet ring wall 11 of substantially uniform thickness. As shown in FIG. 4B in the illustrated example, as one moves upwards along the longitudinal axis 16 (e.g., in the direction towards the partially closed top 13) the thickness of sections of the ring wall 11 are varied to provide regions where the thickness of the wall (in the radial direction) is decreased. For example, in FIG. 4B it will be seen that there are four regions 14a, 14,b, 14c, 14d where the thickness of the ring wall 11 is adjusted to provide four generally scallop-shaped open areas. These open areas define a plurality of symmetrically arranged passages through which fluid can flow. In the example of cage insert 1, for at least one radial position (defined relative to the longitudinal axis) the thickness of the ring wall will vary from a first thickness at a first point along the longitudinal axis 16 to a second thickness at a second point along the longitudinal axis 12. For example, for the radial position corresponding to radius 15 in FIGS. 4A and 4B, it will be seen that the thickness of the ring wall 11 varies from a first radial thickness 15a corresponding to a first longitudinal point associated with the cross-section reflected in FIG. 4A to a second, lesser radial thickness 15b in FIG. 4B corresponding to a second longitudinal point associated with the cross-section reflected in FIG. 4B. It will also be noted that the first longitudinal point associated with FIG. 4A is longitudinally closer to the inlet opening 1 than is the second longitudinal point associated with FIG. 4B.

As also shown 4B, for at least one radial cross-section in section 10 of cage insert 1, the radial thickness of the ring wall 11 varies from a first thickness 16a along a first radial line 16a, to a second thickness 16b along a second radial line 16b, where the second thickness is less than the first thickness, to a third thickness 16c along a third radial line 16c, where the third thickness is less than the second thickness.

It will also be appreciated from FIG. 4B that in the exemplary embodiment of cage insert 1, that each of the regions 14a, 14b, 14c and 14d defines an open area through which fluid can flow out of the cage insert 1, wherein the width of the open region varies from a first width at a first radial distance from the center point associated with longitudinal axis 16 to a second width at a second radial distance from the center point. For example, looking at region 14b, it will be seen that the width of the region varies from a first width at a first radial distance (reflected by the dashed line) to second width at a second radial distance (reflected by the dotted line) where the first radial distance is less than the second radial distance and where the first width is greater than the second width.

Although not depicted in FIG. 4B portions of the inlet ring 11 defining the open areas 14a-14d can be varied in a tapered manner such that radial thickness (and possibly the circumferential width) of the open areas 14a-14d varies as one moves along the longitudinal axis 16 from the open inlet 12 towards the partially closed top 13. In such embodiments the variation can be such that the radial thickness of the inlet ring sections defining the open areas varies from a first radial thickness at a first longitudinal point along the longitudinal axis 16, to a second radial thickness at a second longitudinal point along the longitudinal axis 16, where the first point is closer to the open end 12 than the second point and where the first thickness is greater than the second thickness. In such embodiments the radial thickness of the openings 14a-14d defined by the inner ring will vary from a first radial thickness at the first point to a second radial thickness at the second point. Such a variation in the dimensions of the open areas 14a-14b, through use of an inlet ring wall having a tapered profile in certain areas, provides for a gradual progressive change in the flow area across the valve gage 1 within the first section 10 that provides for smoother valve ball movement within the cage insert 1, and smoother valve ball seating than is available from conventional designs.

FIGS. 4C-4F each show a cross-section of cage insert 1 taken across a portion of the second section 20 of cage insert 1 corresponding to one of the section lines C-F identified in FIG. 4. As reflected in FIGS. 1A-1B, 2 and FIGS. 4C-4F, within each of these sections, the cage insert 1 defines a plurality of side ribs 21a, 21b, 21c, 21d, with each side rib extending longitudinally in a direction that is generally parallel to the longitudinal axis 16. As reflected in the figures under discussion, these side ribs collectively define a plurality of side openings, with each side opening being defined by adjacent side ribs, and each side opening defining a region through which fluid can pass out of the cage insert 1.

In the example under discussion, it there are four side ribs defining four side openings. It will be appreciated, however, that the number of ribs—and this side openings defined by the side ribs—can be varied without departing from the teachings of the present disclosures. In some embodiments, however it is preferential to have an even number of side ribs, such that the number of side openings is equal to the number of side ribs. In such embodiments, it may be desirable to have the side ribs positioned such that the side ribs (and thus the openings defined by the ribs) are symmetrically positioned about a center point such that cross sectional areas across each of side ribs across such plane are substantially identical (i.e., within manufacturing tolerances).

As further reflected in FIGS. 4 and 4C-4F, in the illustrated example, over the second section 20 of cage insert 1, along a given plane passing normally through the longitudinal axis 16, the circumferential width of each opening defined by the side ribs at a first radial distance from the longitudinal axis (e.g., the circumferential width associated with the dashed line at point 23a in FIG. 4D) varies from the circumferential with of such opening at a second radial distance from the longitudinal axis (e.g., the circumferential width associated with the dotted line at point 23b in FIG. 4D). In the example of FIG. 4D, it will be appreciated that the circumferential width at point 23a is less than the circumferential width at point 23b.

It should be noted that the discussion above (and the related discussion below directed to FIGS. 8A-8D) refers to aspects of "openings" of a ball valve cage. It will be appreciated that these openings are defined by the structural ribs of the cage such that the discussion could, instead of referring to the circumferential width of openings at various points, have been made in the form of a reference to the circumferential width of the ribs at such points.

As further shown in FIGS. 4C-4F, in the illustrated example of cage insert 1, over the longitudinal expanse of the second section 20, each side rib defines an inner surface and an outer surface, wherein the inner surface is radially closer to the longitudinal axis than the outer surface and wherein the angular span of the rib at the inner surface is substantially equal to the angular span of the rib at its outer surface. For example, in FIG. 4E, side rib 21c defines an inner surface and an outer surface were the angular span (reflected by the dashed lines 25a and 25b) of the side rib 21c is substantially the same at the inner surface as it is at the outer surface.

It will also be appreciated that, in the exemplary embodiment for cage 1, the ribs are formed such that lines passing along the side surfaces of a given rib (and/or side surfaces of any rib) will all pass through a point. This is reflected in FIG. 4E where lines 25a and 25b, both passing along the side surface of rib 21c and where lines passing along the side surfaces of rib 21b (not labeled) all intersect at the same point 27.

FIGS. 4G-4I reflect cross sections taken across radial planes associated with the third section 30 of the exemplary cage insert 1. As reflected in these figures, across at least part of the longitudinal expanse of the third section 30, the cage insert 1 includes a plurality of closure rib sections 31a, 31b, 31c, and 31d, each extending at least in part from a first point at a first radial distance from the longitudinal axis 16 to a second point at a second radial distance from the longitudinal axis 16 wherein the first point is radially closer to the longitudinal axis 16 than is the second point, and wherein, as measured at a given radial distance from the longitudinal axis, the circumferential width of each closure rib varies from a first circumferential width at a first point on the longitudinal axis to a second circumferential width at a second point on the longitudinal axis. So for example looking at the closure rib 31b, it will be seen that for the illustrated exemplary embodiment the circumferential width of the closure rib varies for a given radial distance (corresponding to the dashed circle in FIGS. 4G and 4H) from a first thickness at the longitudinal point corresponding to FIG. 4G, to a second thickness at the longitudinal point corresponding to FIG. 4H, where the first thickness is greater than the second thickness and where the first longitudinal point is closer to the open end 12 of the cage insert 1 than is the second longitudinal point. As a review of FIGS. 4G-4I shows, in the illustrated example, the circumferential width of each closure rib section decreases as one moves along the longitudinal axis 16 towards the partially closed top end 13 of cage insert 1 and away from the open bottom end 12.

It will be appreciated that the reference to the "top" and "bottom" ends of the cage insert 1 are for discussion purposes only and that—in a physical embodiment as used—the portion of the cage identifies as the top of the cage in the present discussion could physically be vertically below the open end of the cage.

As reflected in FIG. 5, the exemplary cage insert 1 embodiment may be used in a sucker rod pump assembly wherein the cage insert 1 is affixed within a pump cage 50. While the cage insert 1 may be positioned and retained within the pump cage 50 through any suitable means, in certain embodiments the cage insert 1 will be held in placed by a process in which the cage insert 1 is inserted into an open space within the sucker rod and then friction welded to the pump cage Such friction welding may result in the formation of protrusion areas 51a. As will be appreciated, in such an arrangement a valve ball (not shown) will be positioned within the cage insert 1 and such that it can move from a valve fully closed position to a valve fully open position. As the ball transits from its fully closed position to its fully open position, the interaction of the valve ball and the cage insert 1 will create flow paths through which fluid can flow through a path in which fluid enters the bottom option section 12 of the insert 1 and flows through and out of the top section 10 (or vice versa). As will be appreciated the total are through which fluid may flow into (or out of) the cage insert 1 will vary as the valve ball transits from its fully closed to its fully open position and will vary, across a plane normal to the longitudinal axis 16, at differing points along the longitudinal axis.

As reflected in FIG. 5, and also shown in FIGS. 1A-1B and FIG. 4, the cage insert 1 is formed such that its outer profile is generally cylindrical in form. In other words, the outer surfaces of cage insert 1 are all generally located at the same radial distance from the longitudinal axis 16's centerline. This is reflected in FIG. 5 where the longitudinal axis 16 is show and where it can be seen that the outer surfaces of cage insert 1 are all located at substantially the same radial distance from the longitudinal centerline 16.

It will also be appreciated that, as used in the sucker-rod pump assembly depicted in FIG. 5, the cage insert 1 fits within the pump cage 50, such that there are no appreciable open spaces created between the outer surfaces of the cage insert 1 and the inner surfaces of the pump cage 50. As will be seen, when cage insert 1 is positioned within the sucker rod 50, the outer surfaces of cage insert 1 closely abut the adjacent inner surfaces of the pump cage 50.

This arrangement depicted in FIG. 5 is such that the majority of the fluid flowing through cage insert 1, flows along a path that is within the cylinder defined by the outer surfaces of cage insert 1. This is not the only arrangement in which a ball cage insert constructed in accordance with teachings of this disclosure can be used.

A second exemplary embodiment of a sucker rod pump ball valve cage insert 2 incorporating certain aspects of the present disclosure is generally illustrated in FIGS. 6A-6B, 7A-7B and FIG. 8.

Figure 6A:
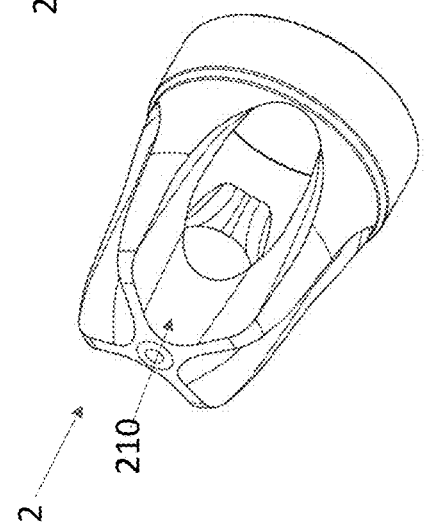
FIGS. 6A and 6B illustrate perspective views of a second exemplary ball valve cage insert 2, with FIG. 6A reflecting a perspective view showing a partially closed top and certain sides of the cage insert 2 and FIG. 6B reflecting a perspective view showing an open bottom and certain sides of the cage.
Figure 6B:
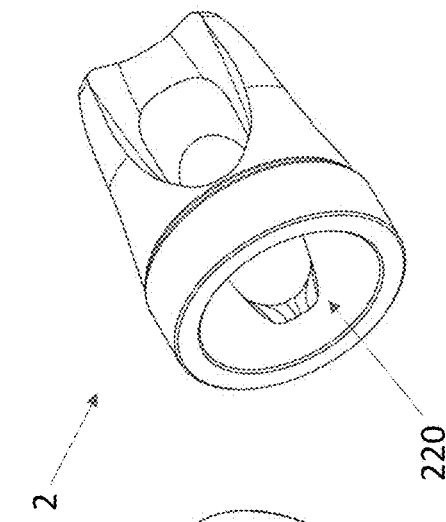
Figure 7A:
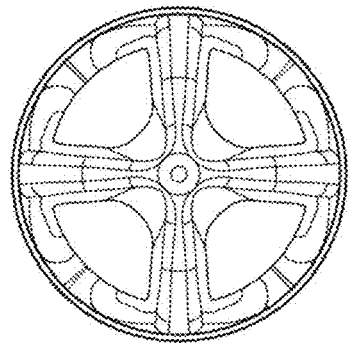
FIG. 7A illustrates a top-down view of the cage insert 2 looking down onto the partially closed top.
Figure 7B:
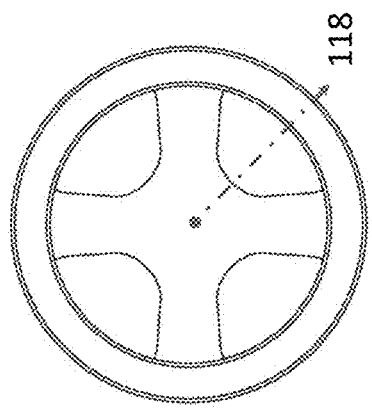
FIG. 7B illustrates a bottom-up view of cage insert 2 looking up from the open bottom.
Figure 8:
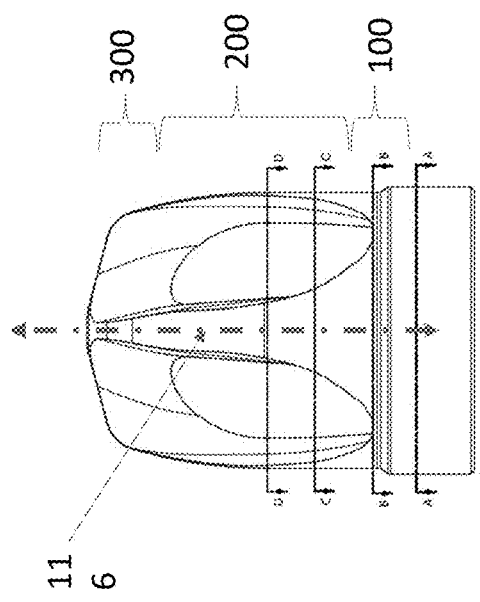
FIG. 8 shows a side view of cage insert 2.

FIGS. 6A and 6B illustrate perspective views of the exemplary ball valve cage insert 2, with FIG. 6A reflecting a perspective view showing a partially closed top 210 and certain sides of the cage insert 2 and FIG. 6B reflecting a perspective view showing an open bottom 220 and certain sides of the cage insert 2. FIGS. 7A and 7B illustrate top-down and bottom-up views of cage insert 2. FIG. 8 illustrates a side view of cage insert 2.

The ball cage insert 2 may be constructed and formed in the manner discussed above in connection with exemplary ball cage insert 1.

Referring to FIGS. 6A-6B, 7A-7B and 8, it may be seen that—like the first exemplary embodiment reflected by cage insert 1—the exemplary embodiment associated with cage insert 2 defines a longitudinal axis 116 and three sections 100, 200 and 300. In the embodiment reflected by cage insert 2, however, the longitudinal length of the second section 200 is approximately only twice the longitudinal length of the first section 100 and the longitudinal length of the third section 300 is approximately 1.5 times the length of the first section 100.

Figures 8A, 8B, 8C, 8D:
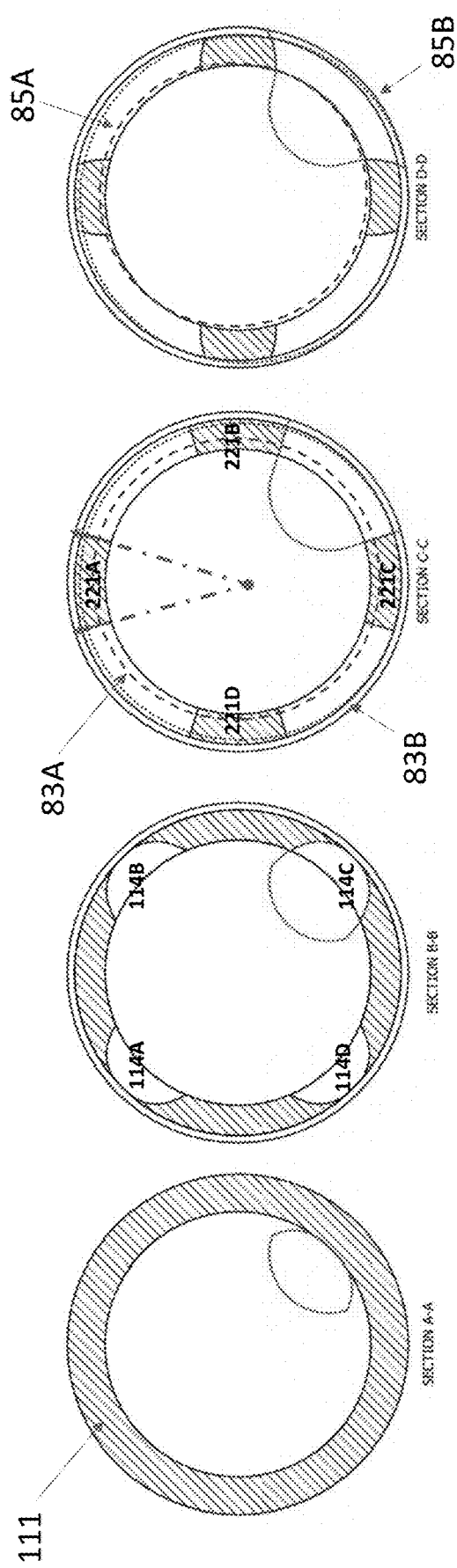
FIGS. 8A-8D show various cross-sections taken across the section lines A-D depicted in FIG. 8.

FIGS. 8A-8D show cross sections of the insert 2, taken across the section lines A-D in FIG. 8 along various planes normal to the longitudinal axis 116 of the cage insert 2. In general, the cross sections associated with FIGS. 8A and 8B are associated with the first section 100 of cage insert 2 and the cross-sections associated with FIGS. 8C-8D are associated with the second section 200 of cage insert 2.

Turning to FIGS. 8A and 8B it will be appreciated that, like the first section 10 of cage insert 1, the first section 100 of cage insert 2, is associated with a portion of the cage insert 2 that does not include any side openings through which fluid can flow from the interior of the cage to the exterior of the cage.

As shown in FIGS. 8A and 8B, the first section 100 of cage insert 2 defines an inlet ring wall 111 having a thickness that varies in the manner previously described with respect to the inlet right wall 11 of cage insert 1, where the inlet ring wall defines open regions through which fluid can flow (as previously described with respect to cage insert 1).

As shown in FIGS. 8C and 8D, over the longitudinal expanse of the second section 200, cage insert 2 defines a plurality of side ribs 221a, 221b, 221c, 221d, with each side rib extending generally along the longitudinal axis 116 and with the side ribs collectively define a plurality of side openings, with each side opening being defined by adjacent side ribs, and each side opening defining a region through which fluid can pass into or out of the cage insert 2.

As shown in FIGS. 1A-1B, 2 and 8C and 8D, in the illustrated example of cage 2, over one portion of the second section 200, along a given plane passing normally through the longitudinal axis 116, the circumferential width of each opening defined by the side ribs at a first radial distance from the longitudinal axis varies from the circumferential with of such opening at a second radial distance from the longitudinal axis. Thus, for example, the circumferential width associated with the dashed line at radial point 83a in FIG. 8C varies from the circumferential with of such opening at a second radial distance from the longitudinal axis, for example, the circumferential width associated with the dotted line at point 83b in FIG. 8C. And, as another example, the circumferential width associated with the dashed line at radial point 85a in FIG. 8D varies from the circumferential with of such opening at a second radial distance from the longitudinal axis, for example, the circumferential width associated with the dotted line at point in FIG. 8D.

It will be noted, however, that the variation in circumferential widths of the openings in FIG. 8C is different from the variation shown in FIG. 8D. For example, in FIG. 8C it will be appreciated that the circumferential width at point 83a is less than the circumferential width at point 83b while it will be appreciated that in FIG. 8D, the circumferential width at point 85a is greater than the circumferential width at point 85b.

As further shown in FIG. 8C, in the illustrated example of cage insert 2, over at least a portion of the longitudinal expanse of the second section 200, each side rib defines an inner surface and an outer surface, wherein the inner surface is radially closer to the longitudinal axi s than the outer surface and wherein the angular span of the rib at the inner surface is substantially equal to the angular span of the rib at its outer surface. For example, in FIG. 8C, side rib 221a defines an inner surface and an outer surface were the angular span (reflected by the dashed lines unlabeled) of the side rib 221c is substantially the same at the inner surface as it is at the outer surface.

As shown in FIG. 8D, the situation described above in connection with FIG. 8C does not exist across the entirety of the linear expanse of the second section 200 of cage insert 2. Rather, as FIG. 8D shows, over at least a portion of such linear expanse the circumferential width of the inner surface of each rib is greater than the circumferential width of the outer surface of each rib This is shown in FIG. 8D where, for side rib 221b, the circumferential width of the inner surface of rib 221b is greater than the circumferential width of the outer surface of rib 8221b. Thus, in the cage insert 2 embodiment, circumferential widths of the inner and outer surfaces of the ribs vary, such that—over a first longitudinal expanse of the rib, the circumferential width of the inner surface is less than the circumferential width of the outer surface (e.g., as shown in FIG. 8C) and over a second longitudinal expanse of the rib, the circumferential width of the inner surface is greater than the circumferential width of the outer surface (e.g., as shown in FIG. 8D).

As FIGS. 8C and 8D also shows, in the embodiment associated with cage insert 2, the side surfaces of each rib are not linear (or flat) along the entire longitudinal expanse of the rib but rather vary such that, along a first longitudinal expanse, the side surfaces are relatively flat (as show in FIG. 8C) and that, along a second longitudinal expanse, the side surfaces are curved (as shown in FIG. 8D).

As additionally reflected in FIGS. 8C and 8D, across at least part of the longitudinal expanse, the circumferential width of each rib varies from a first circumferential width at a first point on the longitudinal axis to a second circumferential width at a second point on the longitudinal axis. So for example looking at the closure rib 221b, it will be seen that for the illustrated exemplary embodiment the circumferential width of the closure rib varies for a given radial distance (corresponding to the dashed circles in FIGS. 8C and 8D) from a first width at the longitudinal point corresponding to FIG. 8C, to a second width at the longitudinal point corresponding to FIG. 8D, where the first thickness is greater than the second thickness and where the first longitudinal point is closer to the open end 220 of the cage insert 2 than is the second longitudinal point. Thus, as a review of FIGS. 6A-6B, 8 and 8C-8D shows that, in the illustrated example, across at least one longitudinal expanse, the circumferential width of each rib decreases as one moves along the longitudinal axis 116 towards the partially closed top end 210 of cage insert 2 and away from the open bottom end 220.

FIGS. 9, 10 and 10A-10B illustrate one way the cage insert 2 may be used in a sucker rod pumping assembly. Referring to FIG. 9, the cage insert 2 is depicted as being positioned within a \ pump cage 90. The cage insert 1 may be positioned and affixed to the pump cage 90 using friction welding (in the manner generally discussed above in connection with FIG. 5) or may be fixed in any other suitable manner.

As may be noted in FIG. 9, unlike the pump cage 50 in the example of FIG. 5, the interior surfaces of rod pump cage 90 are formed (or machined) to provide one or more recessed areas (such as area 91a in FIG. 9) that provide open spaces through which fluid can pass. These open spaces within the rod pump cage 90—in combination with the cage insert 2—thus together establish the flow area profile for the ball valve assembly shown in FIG. 9. Note that for illustrative purposes the valve ball is not shown in any of FIGS. 9, 10, 10A-10B (and others), although it will be appreciated that the valve ball will be positioned within the cage insert 2 in a fully assembly sucker rod pump.

FIGS. 10 and 10A-10B further illustrate the manner in which the cage insert 2 interacts with the pump cage 90 to define areas through which fluid can pass with FIG. 10 illustrating a top-down view of the assembly of FIG. 9 and FIGS. 10A and 10B illustrating cross sections taken along section lines A and B in FIG. 10.

As FIGS. 10, 10A and 10B show the combination of the cage insert 2 (with its ribs and openings) and the recesses in rod pump cage 90 together define areas through which fluid can flow through the sucker rod along a path where fluid flows: (i) into the bottom opening of the cage insert 2; (ii) through the cage insert 2; (iii) out through one of the openings defined by cage insert 2 and into a recess formed within the rod pump cage 90); and (iv) up and out the rod pump cage 90. One such flow paths is shown by line 101a in FIG. 10B.

Figure 11:
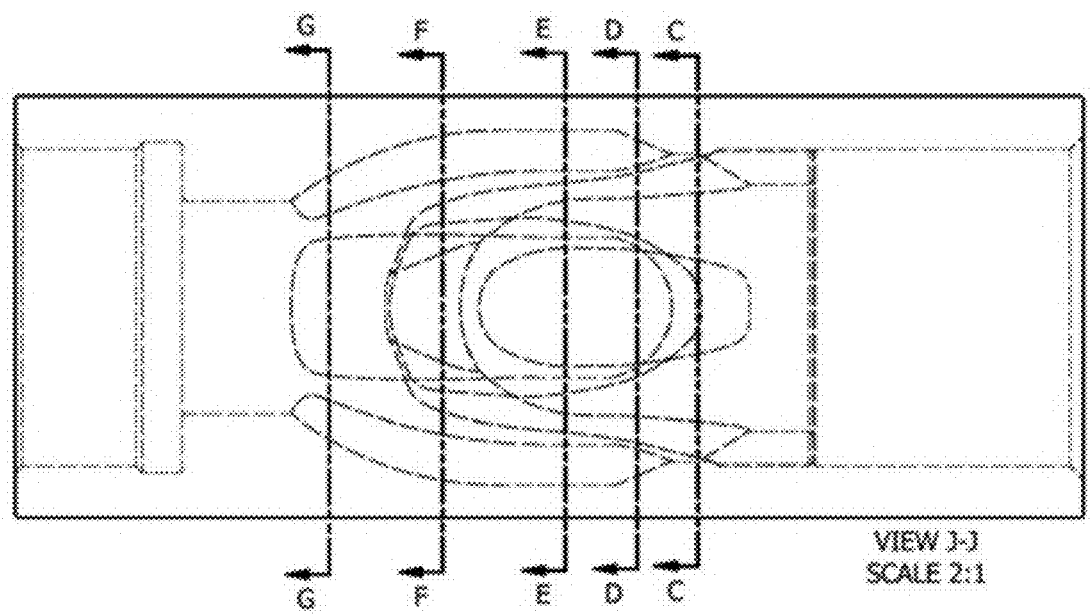

Additional details of the flow paths created by the interaction of cage insert 2 and the recesses formed or machined into rod pump cage 90 are reflected in FIG. 11 and FIGS. 11C-11G, with FIG. 11 showing a side view of the assembly of FIG. 9 and FIGS. 11C-11G showing various cross-sections taken along section lines C-G in FIG. 11. As reflected in those drawings the interaction of cage insert 2 and the recesses within the rod pump cage 90 are such that the flow passage areas created through such interaction vary along the longitudinal expanse of the cage insert 2.

The described exemplary ball cage inserts are believed to have superior performance in use and with respect to the long-term structural integrity of the insert over time because—as compared to conventional designed ball cage inserts—they provide superior flow characteristics as a valve ball travels longitudinally within the ball cage. For example, the novel design aspects of the disclosed ball cage inserts tend to avoid or minimize the extent and number of abrupt surface transitions that fluid flowing through the ball cage insert will encounter as it flows through the insert and also minimize or limit the extent to which any abrupt cross-sectional changes in the flow area defined by the ball valve cage occur.

Figure 12:
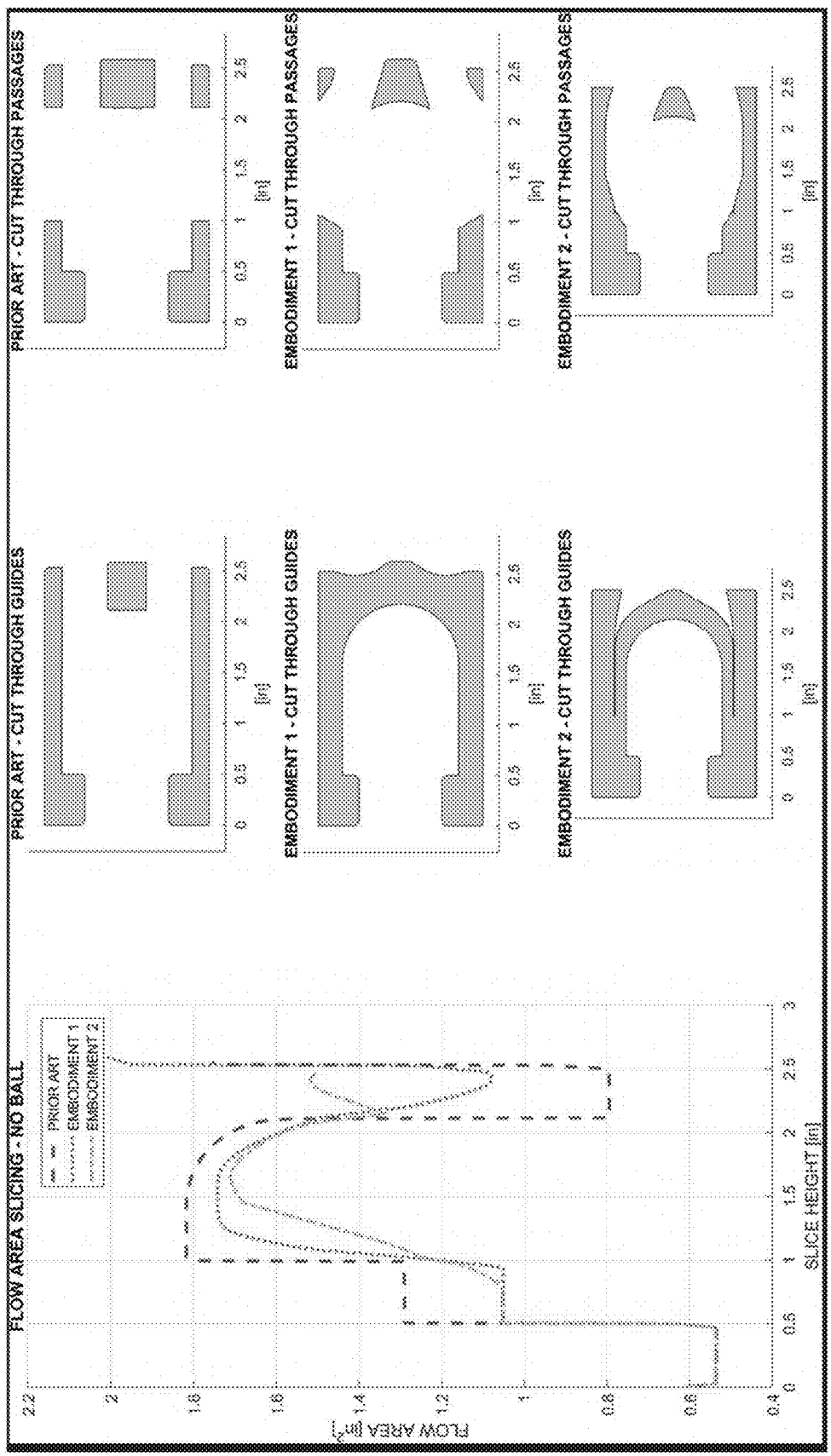
FIGS. 12 and 13 illustrate modeled surface area characteristics of embodiments corresponding to cage insert 1 and cage insert 2 as compared to a conventional cage insert design.
Figure 13:
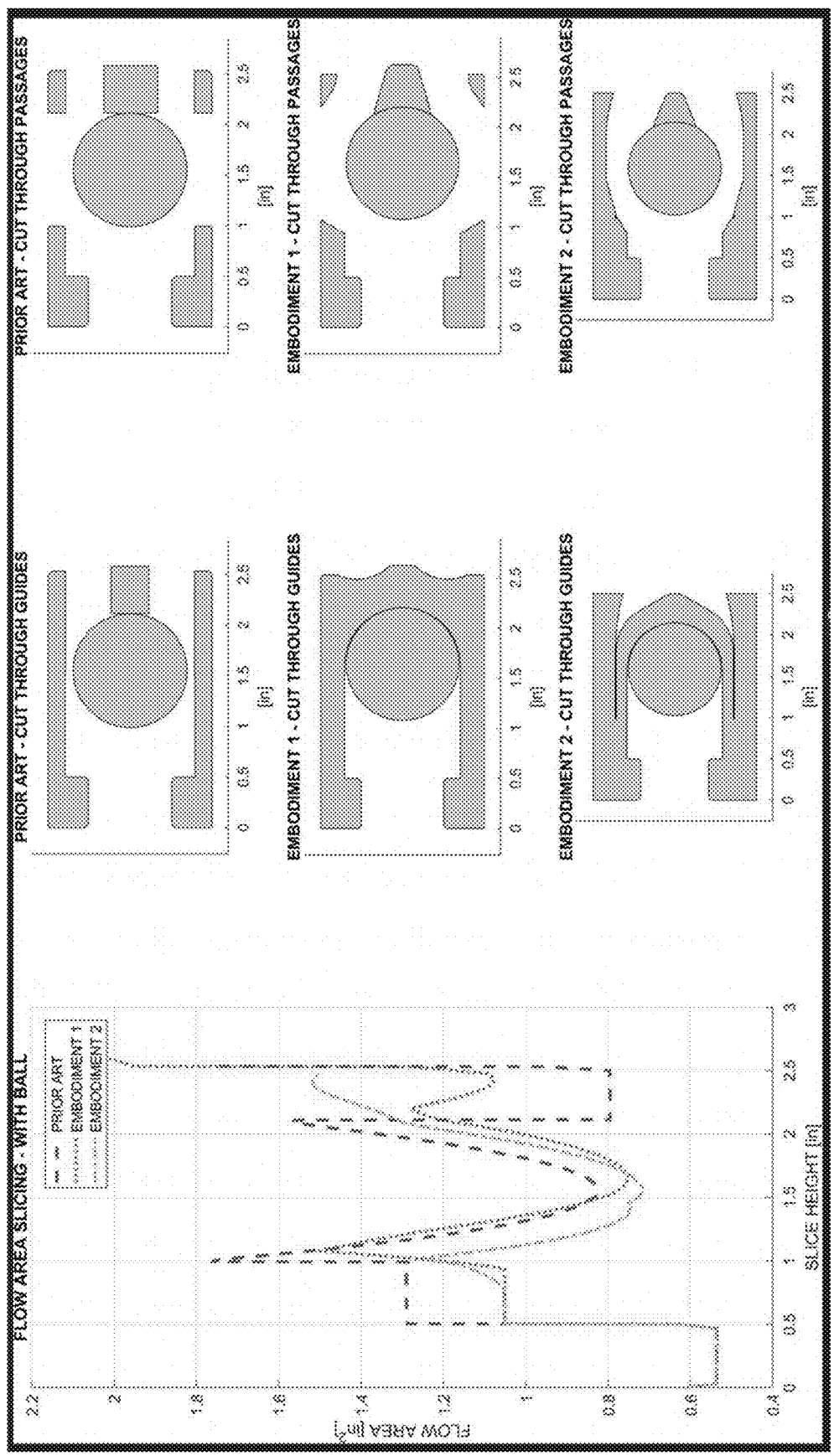

These aspects of the disclosed embodiments are reflected generally in FIGS. 12 and 13.

FIG. 12 generally illustrated the determined flow areas at various longitudinal slice points for: (a) a conventional ball cage valve (labeled "Prior Art" in the FIG.); (b) a ball cage insert corresponding to the exemplary cage insert 1 discussed above (labeled "Embodiment 1") and (c) a ball cage insert and sucker rod pump assembly corresponding to the exemplary cage inset 2 and rod pump cage 90 discussed above (labeled "Embodiment 2"). For purposes of reference the geometries used for the modeled cage inserts are shown in the right two sections of FIG. 12 with the leftmost column of images reflecting the geometries of the modeled inserts cut through the ribs (or guides) and with the rightmost column of images reflecting the geometries as cut through the openings (or passages).

The leftmost image of FIG. 12 comprises a graph showing the total flow area (in square inches) at various longitudinal slice heights for each of the modeled inserts. As that graph shows, the conventional design exhibits abrupt and substantial changes in the total flow are at least four locations (e.g., slice height 0.5, 1.0, approximately 2.25, and 2.5. As that graph further shows, while Embodiments 1 and 2 exhibit abrupt flow area changes at the slice height 0.5, the magnitude of the abrupt change at that point is substantially less than for the conventional design. Specifically, in the illustrated example, the magnitude of the change for the conventional design is approximately 0.8 (1.3-0.6), while the magnitudes for the Embodiments 1 and 2 are approximately 0.6 (1.1-0.5). Further, neither of the Embodiments 1 or 2 exhibit abrupt flow area changes at any other positions. As shown at the figures for slice heights 1 and 2, each of Embodiments 1 and 2 exhibits a flow area change that varies in a more gradual manner as one moves longitudinally across those slice heights.

It will be appreciated that for all of the illustrate cage inserts, the abrupt change at the slice higher 0.5 occurs because slice height 0.5 is associated with the ball seat, in which a portion of the valve ball will rest when the ball valve is closed. It will further be appreciated that for the conventional cage insert, there are three points at which there is a step change in the flow area (namely slice heights 0.5, 2.25 and 2.5). For purpose of this discussion a step change as a change where the ratio of the change in the flow area (in square inches) as one moves linearly along the longitudinal axis (in inches) is more than ten (10). As seen in FIG. 12, for the conventional cage insert there are at least four (4) step changes as one moves across the longitudinal expanse of the insert; while for Embodiments 1 and 2, there are fewer than three (3) step changes. Further, in the specific illustrated examples of FIG. 12 for Embodiments 1 and 2, there is one step change for each of Embodiment 1 and 2 (at the ball set, height 0.5).

FIG. 13 illustrates the same information reflected in FIG. 12, but with the flow area calculated assuming that the vale ball is positioned in the respective valves' fully open positions. Like FIG. 12, FIG. 13 shows that—even with the valve ball in it's the valves' fully opened positions, Embodiments 1 and 2 provide fewer significand changes in the flow area as one moves along the longitudinal length of the modeled inserts and that such changes are of a lesser magnitude. Notably, FIG. 13 also shows that for the illustrated Embodiments 1 and Embodiments 2 shows that the geometries of the described Embodiments 1 and 2 are such that—when the valve ball is in the fully open position—over the top 25% of the longitudinal length of the inserts (the length between 2 and 2.5 in the example) the flow area is always above all other flow areas provided by the insert (or the combination of the insert and the rod passages for Embodiment 2). Note that this is not the case for the modeled conventional cage design where, across the same top 25% region, the flow area is below that of all other areas.

The reductions and minimizations in abrupt flow area changes as shown in FIGS. 12 and 13 as compared to conventional designs are, individually and collectively, believed to improve the flow conditions through the exemplary ball cage inserts (both without a ball valve and at all ball valve positions), reduce or eliminate unwanted chatter and pressure drips, and promote superior performance and life of the exemplary inserts.

Other and further embodiments utilizing one or more aspects of the inventions described above can be devised without departing from the spirit of Applicant's invention. Discussion of singular elements can include plural elements and vice-versa.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed is:

1. A ball valve cage comprising:
   a lower ring defining generally circular inlet opening, the generally circular inlet opening defining a center point through which a longitudinal axis passes; and
   a plurality of side ribs, each side rib having a longitudinal length and extending longitudinally from the lower ring, each side rib having an inner surface and an outer surface, wherein the inner surface is radially closer to the longitudinal axis than the outer surface, each side rib defining an angular span with respect to the longitudinal axis; and
   wherein, along at least a majority of longitudinal length of the side ribs, the angular span of each of the side ribs as measured with respect to the longitudinal axis at the inner surface of the rib is the same as the angular span of each side rib as measured with respect to the longitudinal axis at the outer surface of the rib; and
   wherein for at least a first point along the longitudinal axis, lines passing along the sides of the plurality of side ribs will intersect at a common point on the longitudinal axis.

2. The cage of claim 1 wherein the side ribs define side surfaces, and wherein, across a first longitudinal expanse, the side surfaces of the side ribs are flat and wherein, across a second longitudinal expanse, the side surfaces of the ribs are curved.

3. The cage of claim 2 in combination with a sucker rod pump cage, wherein the ball valve cage is positioned within a cavity within the sucker rod pump cage and wherein the interior cavity of the sucker rod pump cage is formed to define a plurality of recessed areas through which fluid can pass.

4. The cage of claim 1, wherein the side ribs collectively define a plurality of openings through which fluid can pass out of the cage and wherein, along a given plane passing normally through the longitudinal axis, the circumferential width of each opening defined by the side ribs at a first radial distance from the longitudinal axis varies from the circumferential width of such opening at a second radial distance from the longitudinal axis.

* * * * *